United States Patent [19]

Macheboeuf

[11] Patent Number: 4,713,695

[45] Date of Patent: Dec. 15, 1987

[54] SYSTEM FOR SUPERIMPOSING PLURAL TELEVISION PICTURES WITH EXTENT OF SUPERIMPOSITION BASED UPON A LINEAR COMBINATION OF THE PICTURE SIGNALS

[75] Inventor: Guy Macheboeuf, Pullay par Verneuil sur Avre, France

[73] Assignee: Etablissment Public Telediffusion de France, Paris, France

[21] Appl. No.: 823,249

[22] Filed: Jan. 28, 1986

[30] Foreign Application Priority Data

Jan. 28, 1985 [FR] France ................... 85 01133

[51] Int. Cl.$^4$ ................. H04N 5/262; H04N 5/272
[52] U.S. Cl. .......................... 358/183; 358/22
[58] Field of Search ................. 358/22, 182, 183

[56] References Cited

U.S. PATENT DOCUMENTS 4,292,649  9/1981  Macheboeuf ............... 358/22
4,360,831  11/1982 Kellar ........................ 358/182
4,602,286  7/1986  Kellar et al. ............... 358/22

FOREIGN PATENT DOCUMENTS

2484109  6/1980  France .

*Primary Examiner*—James J. Groody
*Assistant Examiner*—Robert M. Bauer
*Attorney, Agent, or Firm*—Lowe, Price, LeBlanc, Becker & Shur

[57] ABSTRACT

A television picture superimposing system comprises a video mixer including two variable gain amplifying circuits receiving two input picture signals having a given peak-to-peak amplitude, and an adding circuit for mixing the amplified picture signals into a resulting picture signal. The improvement resides in providing a circuit for deriving a single gain control signal based upon a linear combination of two signals derived respectively from the two input picture signals so that the resulting signal has the given peak-to-peak amplitude. The control signal is respectively applied, via an analog inverting circuit and directly, to gain control inputs of the variable gain amplifying circuits.

22 Claims, 10 Drawing Figures

SYSTEM FOR SUPERIMPOSING PLURAL TELEVISION PICTURES WITH EXTENT OF SUPERIMPOSITION BASED UPON A LINEAR COMBINATION OF THE PICTURE SIGNALS

BACKGROUND OF THE INVENTION

1. Field of the Invention

The present invention relates to a video special effect system for obtaining superimposed color television pictures from the addition of two picture signals or two picture signal groups supplied by two video sources such as video cameras or video tape recorders.

2. Description of the Prior Art

Hereto, superimposed image effects are obtained in black and white television as well as in color television by means of two variable gain amplifiers respectively receiving two picture signals and having completely independent gain controls, the latter usually consisting of adjustable resistors, for example, of two potentiometers. An adder circuit mixes the two amplified picture signals into a resultant picture signal.

Separate adjustment of the potentiometers entails the danger that the resulting signal, resulting from the combination of the two amplified picture signals, exceeds a standard peak amplitude. Such overshooting requires peak limiting or chopping or the resulting signal and, accordingly, leads to distortion of the picture produced by the resulting signal, such as loss of half-tones in the background scene picture on which is superimposed the other, or foreground scene picture representing for instance a ghost, a veil or a rain curtain, or loss of details in the background scene. Such picture defects are more pronounced if the amplitude of the signal representative of either of the two pictures approaches a reference white level corresponding to maximum amplitude. On the other hand, when the amplitude of the signal corresponding to either picture is near the black level, noise and other disturbances, such as spots, affect the resulting signal picture.

OBJECTS OF THE INVENTION

The main object of the present invention is to remedy the above-mentioned defects.

Another object of this invention is to control the gains of both amplifiers with a single gain control signal making it possible to maintain the amplitude of the resulting signal within the standard range of television picture signal amplitudes, regardless of the picture superimpose effect being sought.

A further object of this invention is to provide a new and improved circuit for deriving the gain control signal.

SUMMARY OF THE INVENTION

Accordingly, the invention provides a television picture superimposing system comprising mixing means having first and second variable gain amplifying means for amplifying first and second input picture signals having a predetermined peak-to-peak amplitude into first and second amplified picture signals and adding means for mixing the first and second amplified picture signals into a resulting picture signal, and means for deriving a single gain control signal based upon a predetermined linear combination of first and second signals derived respectively from the first and second picture signals so that the resulting picture signal has the predetermined peak-to-peak amplitude; the gain control signal being applied, via analog inverting means and directly, to gain control inputs of said first and second variable gain amplifying means respectively.

In accordance with the invention, the gain control signal is derived from the two input picture signals, rather than from only one of the two picture signals as it is in color television signal combining systems.

In practice, the two input picture signals represent two groups of the three primary color signals, or two groups each including a luminance signal and two color difference signals, or two NTSC or PAL encoded video signals, or two SECAM encoded video signals.

According to another feature of the invention, the gain control signal deriving means comprises first and second amplifying and offsetting means for offsetting amplitudes of said first and second derived signals and amplifying the first and second offset signals into first and second intermediate signals, means for selecting one of said intermediate signals having higher amplitude, and means for chopping said higher amplitude intermediate signal to derive said gain control signal. Specific parameters, such as offsetting of the black level and amplification gain for each of the first and second picture signals, enable definitive adjustment of the superimposure effect for a given picture sequence. Moreover, the gain control signal automatically depends on only one of the picture signals as a result of the selecting means, so that this signal alone is transmitted when its amplitude approximates the white level. Nevertheless, the superimposure effect is augmented by selecting opposite and, in absolute value, distinctly different gains.

Another feature of the invention is that the gain control signal deriving means comprises means for attenuating the second derived signal, preferably corresponding to a foreground scene, by a predetermined attenuation factor that can be adjusted by an operator, into an attenuated signal applied to the second amplifying and offsetting means. Adjusting the attenuation factor contributes to finer control of the superimposure effect.

BRIEF DESCRIPTION OF THE DRAWING

Other features and advantages of the invention will become apparent from the following more particular description of several preferred embodiments of the invention as illustrated in the appended corresponding drawings in which.

DESCRIPTION OF THE PREFERRED EMBODIMENTS

As can be seen by comparing FIGS. 1A to 1D, a television picture superimposing system $1a$, $1b$, $1c$ or $1d$ embodying the invention comprises one, two, or three mixers, also called combiners, each of which mixes two input video signals or two groups of input picture signals transmitted in parallel, and a gain control circuit 12 which is the main subject of the invention. The choice of superimposing system depends upon the nature of the signals representing two color television pictures $P_1$ and $P_2$.

Figure 1A:
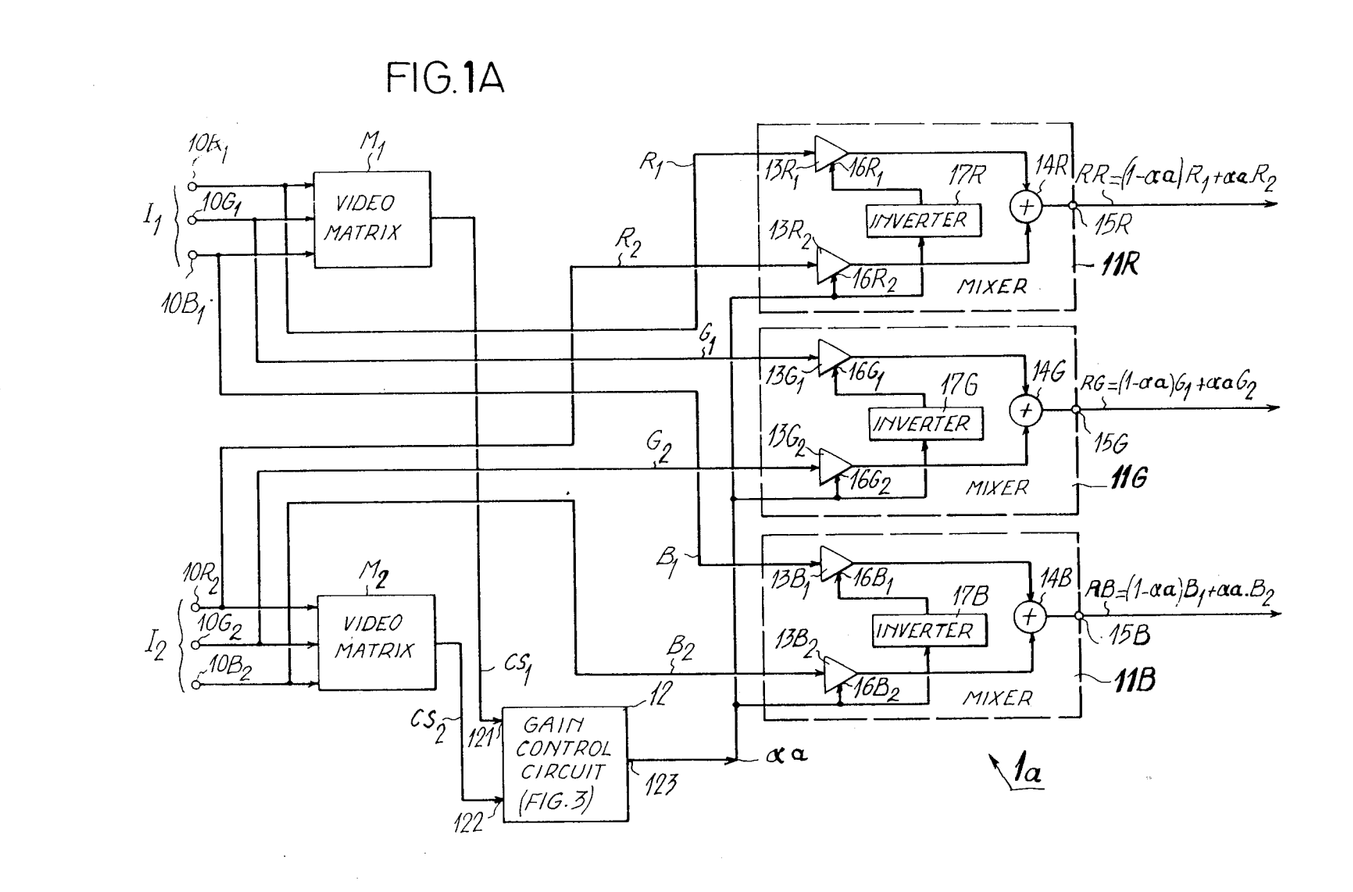
FIGS. 1A, 1B, 1C and 1D are respectively block diagrams of four different television picture superimposing systems embodying the invention.

When the pictures $P_1$ and $P_2$ are respectively represented by first primary color signals $R_1$, $G_1$, $B_1$ and second primary color signals $R_2$, $G_2$, $B_2$ transmitted in parallel, relating to the red, green and blue colors, a picture superimposing system 1a as illustrated in FIG. 1A comprises two video matrices $M_1$ and $M_2$, three mixers 11R, 11G and 11B and the gain control circuit 12. The matrices $M_1$ and $M_2$ respectively receive input signals via input terminals $10R_1$, $10G_1$, $10B_1$ and $10R_2$, $10G_2$, $10B_2$ and respectively combine the primary color signals $R_1$, $G_1$ and $B_1$ representing the first picture $P_1$ with the primary color signals $R_2$, $G_2$, $B_2$ representing the second picture $P_2$ to derive composite video signals $CS_1$ and $CS_2$ in a known manner. Signals $CS_1$ and $CS_2$ are applied to respective inputs 121 and 122 of circuit 12. Superimposing is carried out separately for each primary color in a respective mixer 11R, 11G, 11B under the control of a single control signal $\alpha a$ derived at output 123 of circuit 12.

Each mixer 11R, 11G, 11B respectively amplifies the two primary color signals $R_1$ and $R_2$, $G_1$ and $G_2$, $B_1$ and $B_2$ applied to it. Each signal applied to each mixer is respectively amplified and the two amplified signals are added into a resulting signal so mixers 11R, 11G and 11B respectively derive signals RR, RG, RB. In the mixers 11R, 11G, 11B, two variable gain operational amplifiers or analog amplifiers $13R_1$ and $13R_2$, $13G_1$ and $13G_2$, $13B_1$ and $13B_2$ respectively receive signals $R_1$ and $R_2$, $G_1$ and $G_2$, $B_1$ and $B_2$ from inputs $10R_1$ and $10R_2$, $10G_1$ and $10G_2$, $10B_1$ and $10B_2$ and have outputs connected to two inputs of adder circuits 14R, 14B, 14G that perform the actual mixing to supply the RR, RG, RB signals to an output 15R, 15G, 15B, respectively. Each resulting signal RR, RG, RB has an amplitude which is always within a range bounded by two standard voltage limits, namely 0 volt for the black level and 0.7 volts (=WL) for the white level, to avoid clipping and picture quality loss during subsequent processing of the resulting signal.

According to the invention, each mixer 11R, 11G, 11B receives only a single analog gain control $\alpha a$ supplied by the output 123 of circuit 12. Signal $\alpha a$ is applied directly to gain control inputs $16R_2$, $16G_2$, $16B_2$ of amplifiers $13R_2$, $13G_2$. Signal $\alpha a$ is also applied in parallel to analog inverter circuit 17R, 17G, 17B, each of which derives a complementary signal 1-$\alpha a$ that is respectively applied to gain control inputs $16R_1$, $16G_1$, $16B_1$ of amplifiers $13R_1$, $13G_1$, $13B_1$. The three inverter circuits 17R, 17G and 17B can be replaced by a single analog inverter circuit. When signal $\alpha a$ is in the "1" state, corresponding to an amplitude of 1 volt, signals $R_2$, $G_2$ and $B_2$ are coupled to the outputs 15R, 15G and 15B through the amplifiers $13R_2$, $13G_2$ and $13B_2$; the value of $\alpha a = 1$ causes amplifiers $13R_2$, $13G_2$ and $13B_2$ to have a gain of one, and amplifiers $13R_1$, $13G_1$ and $13B_1$ to have a zero gain to disable the transmission of the $R_1$, $G_1$ and $B_1$ signals. In this case, $RR = R_2$, $RG = G_2$ and $RB = B_2$. Conversely, when signal $\alpha a$ is in the "0" state, signals $R_1$, $G_1$ and $B_1$ are transmitted to the outputs 15R, 15G and 15B via the amplifiers $13R_1$, $13G_1$ and $13B_1$ and signals $R_2$, $G_2$ and $B_2$ are blocked by amplifiers $13R_2$, $13G_2$ and $13B_2$; in which case $RR = R_1$, $RG = G_1$ and $RB = B_1$. At an intermediate level between "0" and "1", the signal $\alpha a$ determines the level of the second signals $R_2$, $G_2$ and $B_2$ and the complementary signal 1-$\alpha a$ determines the levels of the signals $R_1$, $G_1$ and $B_1$, equal respectively to the 1 volt complements of the levels of the signals $R_2$, $G_2$ and $B_2$; the resulting signals are such that $RR = (1-\alpha a)R_1 + \alpha a R_2$, where $0 < RR < WL$ volt, $RG = (1-\alpha a)G_1 + \alpha a G_2$ with $0 < RG < WL$ volt, and $RB = (1-\alpha a)B_1 + \alpha a B_2$ where $0 < RB < WL$ volt.

In a variant of this embodiment, the amplifiers $13R_1$, $13G_1$ and $13B_1$, and $13R_2$, $13G_2$ and $13B_2$ are replaced by analog multipliers which derive signals respectively representing the products of the first input signals $R_1$, $G_1$ and $B_1$ and the signal 1-$\alpha a$ and the products of the second input signals $R_2$, $G_2$ and $B_2$ and the signal $\alpha a$.

Thus the signals RR, RG and RB represent a resulting composite video picture combining first and second pictures $P_1$ and $P_2$ that are respectively represented by the signals $R_1$, $G_1$, $B_1$ and $R_2$, $G_2$, $B_2$, with respective attenuations 1-$\alpha a$ and $\alpha a$. However, the amplitude of signal $\alpha a$ depends upon the amplitudes of the signals $CS_1$ and $CS_2$ therefore, respectively, upon the amplitudes of the signals $R_1$, $G_1$, $B_1$ and $R_2$, $G_2$ and $B_2$ and is in general different from 0 or 1 when one of the composite signals $CS_1$ or $CS_2$, such as signal $CS_1$, has an amplitude that is maximal or minimal, contrarily to the prior art picture combining systems. As seen hereinafter, the signal $\alpha a$ results from a linear combination of the amplitudes of the composite video signals $CS_1$ and $CS_2$ and, more exactly, depends sometimes on one and sometimes on the other of these two amplitudes, to superimpose one picture on the other picture. For example, if the second picture $P_2$ is a ghost (FIG. 2, center left side) or a rain curtain (FIG. 2, lower left side) that is to be superimposed on the first picture $P_1$ (FIG. 2, upper left side) representing a background scene, white regions of the second picture appear in the resulting image R (FIG. 2, right side); in this example the first image is slightly transparent therethrough.

Figure 1B:
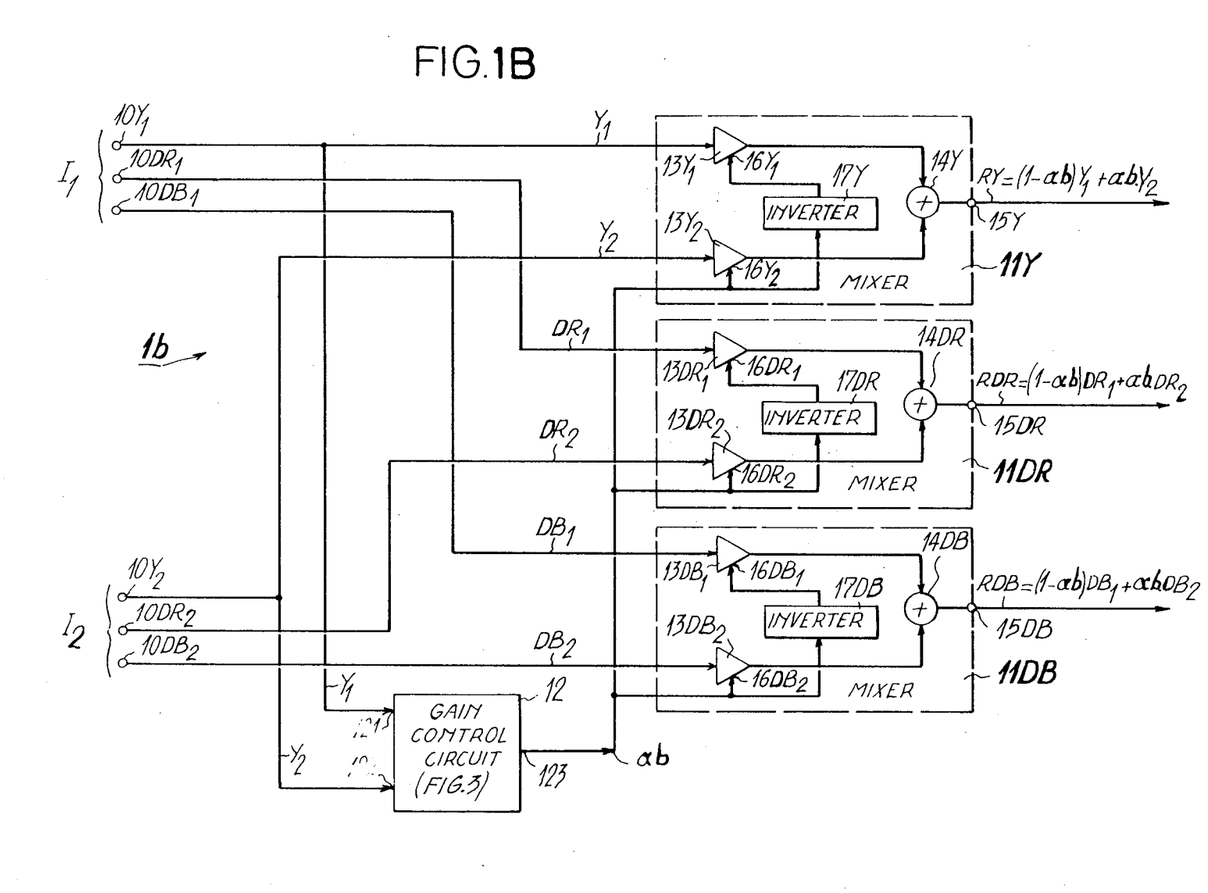

According to a second embodiment shown in FIG. 1B, a superimposing system 1b receives, via three inputs $10Y_1$, $10DR_1$ and $10DE_1$, three component first parallel video signals $Y_1$, $DR_1$ and $DB_1$ representing the first picture $P_1$, and receives, via three other inputs $10Y_2$, $10DR_2$ and $10DB_2$, three component second parallel video signals $Y_2$, $DR_2$ and $DB_2$ representing the second picture $P_2$. The signals $Y_1$ and $Y_2$ are luminance signals, and the other component signals are color difference signals such as $DR_1 = R_1 - Y_1$, $DB_1 = B_1 - Y_1$, $DR_2 = R_2 - Y_2$ and $DB_2 = B_2 - Y_2$. The luminance signals $Y_1$ and $Y_2$ are respectively applied to the inputs $12_1$ and 122 of the gain control circuit 12 to derive a gain control signal $\alpha b$ at the output 123. Like system 1a, picture superimposing system 1b comprises three mixers 11Y, 11DR and 11DB each containing two variable gain amplifiers $13Y_1$ and $13Y_2$, $13DR_1$ and $13DR_2$, and $13DB_1$ and $13DB_2$ respectively, which receive the component signals $Y_1$ and $Y_2$, $DR_1$ and $DR_2$, and $DB_1$ and $DB_2$. Mixers 11Y, 11DR and 11DB respectively include adder circuits 14Y, 14DR, 14DB for respectively deriving on outputs 15Y, 15DR, 15DB signals $RY = (1-\alpha b)Y_1 + \alpha b \cdot Y_2$, $RDR = (1-\alpha b)DR_1 + \alpha b \cdot DR_2$ and $RDB = (1-\alpha b)DB_1 + \alpha b \cdot DB_2$. The control signal $\alpha b$ is applied directly to gain control inputs $16Y_2$, $16DR_2$ and $16DB_2$ of the second amplifiers $13Y_2$, $13DR_2$ and $13DB_2$ included in mixers 11Y, 11DR and 11DB. Signal $\alpha b$ is converted by analog inverter circuits 17Y, 17DR and 17DB into signals representing 1-$\alpha b$, respectively applied to gain control inputs $16Y_1$, $16DR_1$ and $16DB_1$ of the first amplifiers 13Y$_1$, 13DR$_1$ and 13DB$_1$ included in mixers 11Y, 11DR and 11DB.

Figure 1C:
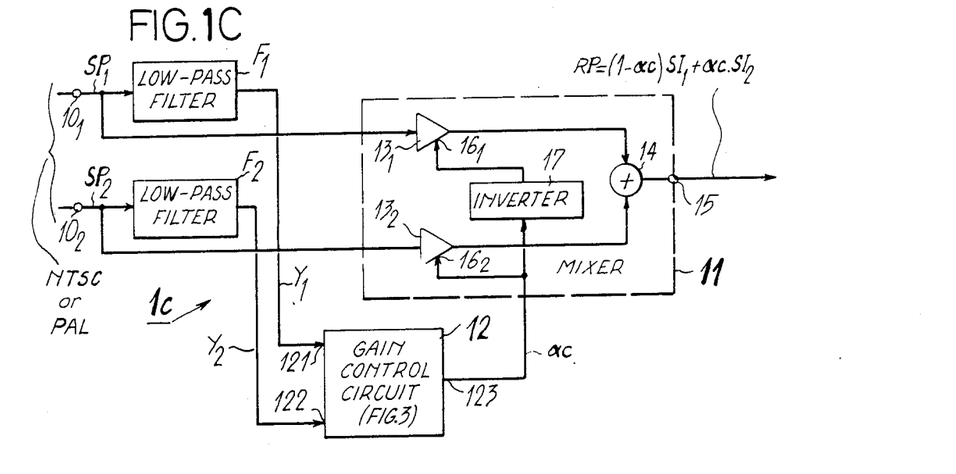
Figure 1D:
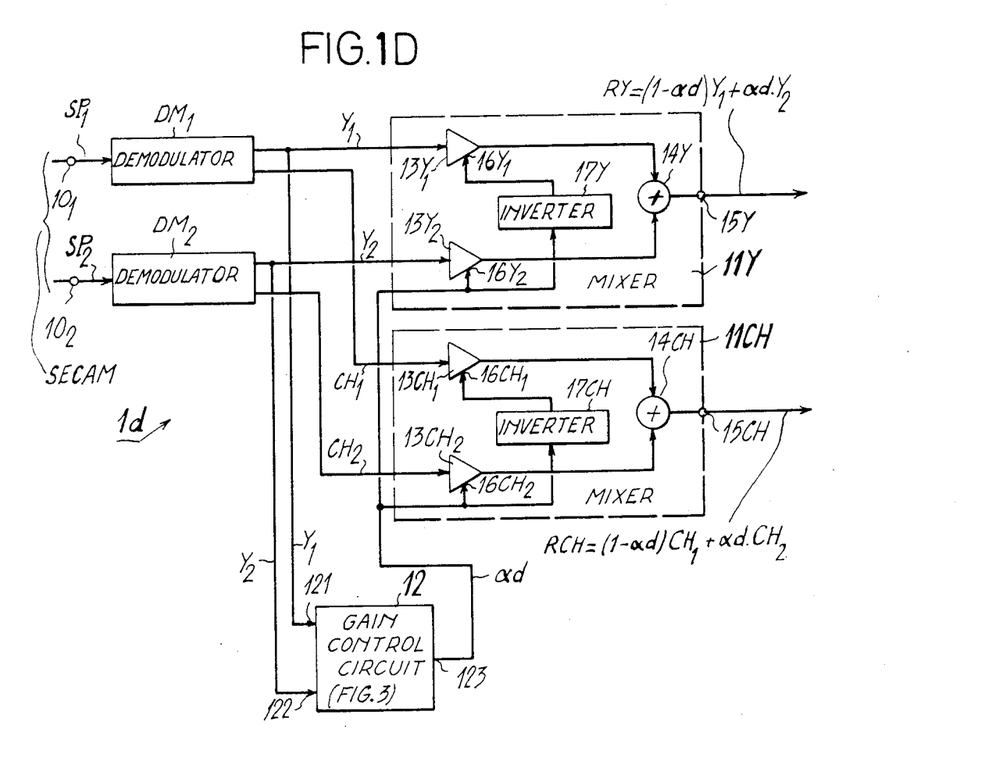

According to third and fourth embodiments of the invention illustrated in FIGS. 1C and 1D, the first and second pictures P$_1$ and P$_2$ are represented by video signals SP$_1$ and SP$_2$ encoded according to one of the known color television standards.

In the third embodiment of FIG. 1C wherein video signals are encoded according to the NTSC or PAL television standard, the superimposing system comprises two low-pass filters F$_1$ and F$_2$ with a cutoff frequency of about 3 MHz to filter the encoded signals SP$_1$ and SP$_2$ respectively into luminance signals Y$_1$ and Y$_2$, respectively applied to the inputs 12$_1$ and 12$_2$ of the gain control circuit 12. The system of FIG. 1C includes only a single mixer 11 comprising two variable gain amplifiers 13$_1$ and 13$_2$ respectively responsive to encoded video signals SP$_1$ and SP$_2$ at inputs 10$_1$ and 10$_2$ of filters F$_1$ and F. Output signals of amplifiers 13$_1$ and 13$_2$ are applied to adder circuit 14 which derives a resulting signal $RP=(1-ac)SP_1+ac \cdot SP_2$. The control signal $ac$ is applied directly to a gain control input 16$_2$ of the second amplifier 13$_2$ and, via an analog inverter circuit 17, to a gain control input 16$_1$ of the first amplifier 13$_1$.

As illustrated in FIG. 1D, the fourth embodiment is adapted to SECAM-standard encoded vide signals SP$_1$ and SP$_2$ and provides a picture superimposing system 1d that receives signals SP$_1$ and SP$_2$ via inputs 10$_1$ and 10$_2$ of two demodulators DM$_1$ and DM$_2$. Demodulators DM$_1$ and DM$_2$ respectively restore via a first output luminance signals Y$_1$ and Y$_2$ applied to the inputs 12$_1$ and 12$_2$ of the gain control circuit 12 and to an input of a variable gain amplifier 13Y$_1$, 13Y$_2$ in a mixer 11Y included in system 1d; circuit 12 responds to signals Y$_1$ and Y$_2$ to derive gain control signal $ad$ at terminal 12$_3$. Second outputs of demodulators DM$_1$ and DM$_2$ respectively supply chrominance signals CH$_1$ and CH$_2$ to inputs of the variable gain amplifiers 13CH$_1$ and 13CH$_2$ of mixer 11CH. The mixers 11Y and 11CH include adder circuits 14Y and 14CH for respectively deriving luminance signal $RY=(1-ad)Y_1+ad \cdot Y_2$ and chrominance signal $RCH=(1-ad)CH_1+ad \cdot CH_2$; signals RY and RCH are respectively derived on outputs 15Y and 15CH. Signal $ad$ is applied directly to gain control inputs 16Y$_2$ and 16CH$_2$ of the second amplifiers 13Y$_2$ and 13CH$_2$ and is converted into signals $(1-ad)$ by analog inverter circuits 17Y and 17CH which derive gain control inputs 16Y$_1$ and 16CH$_1$ of first amplifiers 13Y$_1$ and 13CH$_1$.

In all of the above-described embodiments the input signals and the resulting signals have standardized peak-to-peak amplitudes.

A detailed description is now made of the gain control circuit 12, using S$_1$ and S$_2$ to designate first and second signals applied to the inputs 12$_1$ and 12$_2$, and derived from two input picture signals or two groups of input picture signals. According to the above embodiments, the signals S$_1$ and S$_2$ correspond to the composite video signals CS$_1$ and CS$_2$ derived from the input picture signals R$_1$, G$_1$, B$_1$ and R$_2$, G$_2$, B$_2$ (FIG. 1A) or from input luminance signals Y$_1$ and Y$_2$ (FIG. 1B), or luminance signals Y$_1$ and Y$_2$ derived from television encoded signals SP$_1$ and SP$_2$ (FIGS. 1C or 1D). Hereinafter, $a$ denotes the gain control signal $aa$, $ab$, $ac$ or $ad$.

Figure 2:
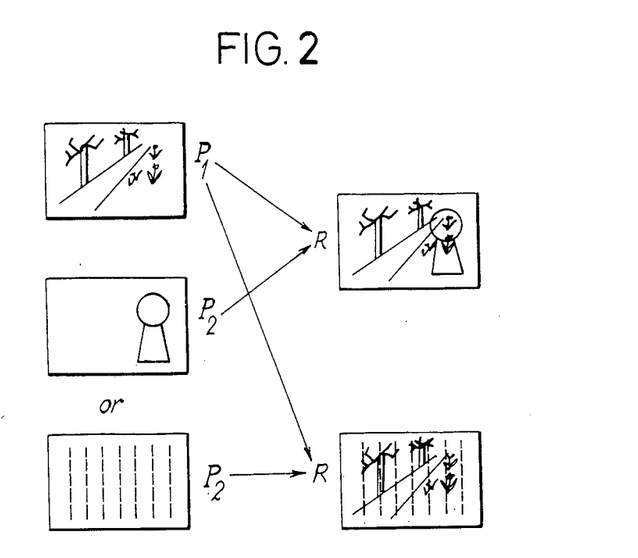
FIG. 2 is a schematical graph of two pictures to be combined to obtain superimposures.
Figure 3:
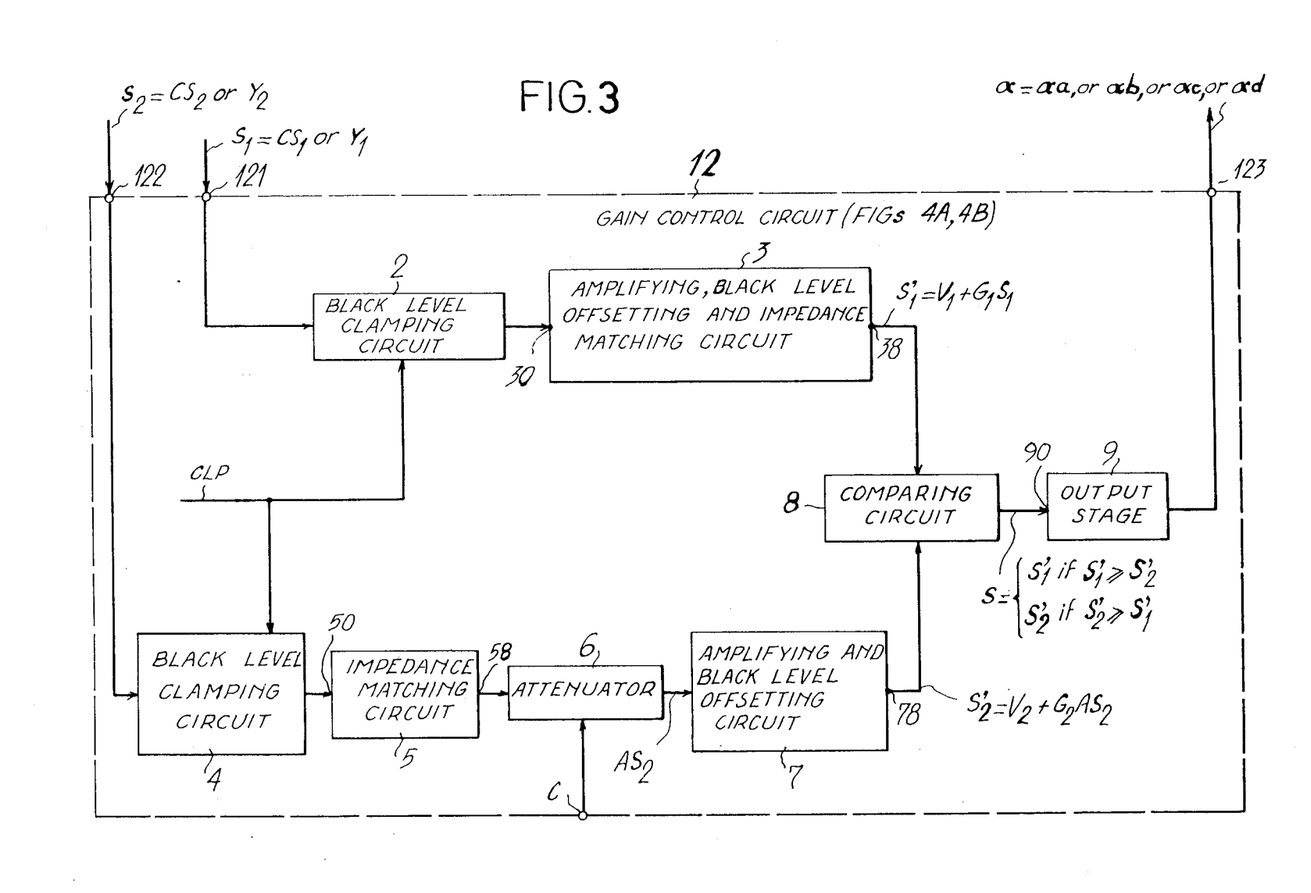
FIG. 3 is a block diagram of a gain control circuit included in all the picture superimposing systems embodying the invention.

As shown in FIG. 2, the gain control circuit 12 comprises first and second channels respectively responsive to first and second signals S$_1$ and S$_2$. The first channel includes black level clamping circuit 2 and an amplifyng black-level offsetting and impedance matching circuit 3, while the second channel includes a black level clamping circuit 4, an impedance matching circuit 5, and attenuator 6 and an amplifying and black level offsetting circuit 7. Circuit 12 further comprises a comparing circuit 8 for selecting the highest of two signals S'$_1$ and S'$_2$ derived by circuits 3 and 7, and an output stage 9 for deriving signal $a$. Circuits 2, 3, 8 and 9 are shown in detail in FIG. 4A and circuits 4, 5, 6 and 7 are shown in detail in FIG. 4B.

Figure 4A:
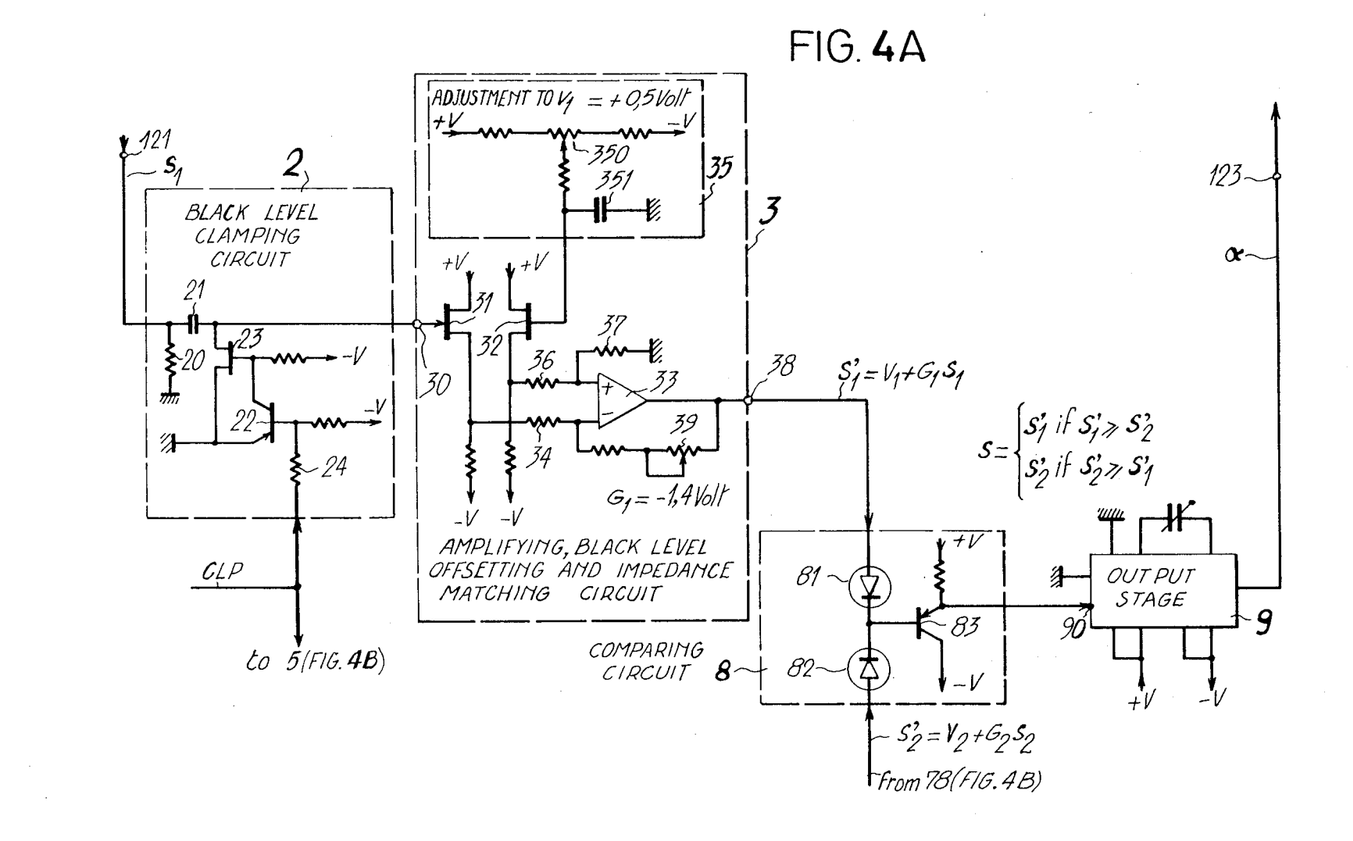
FIGS. 4A and 4B are a detailed circuit diagram of the gain control circuit.
Figure 4B:
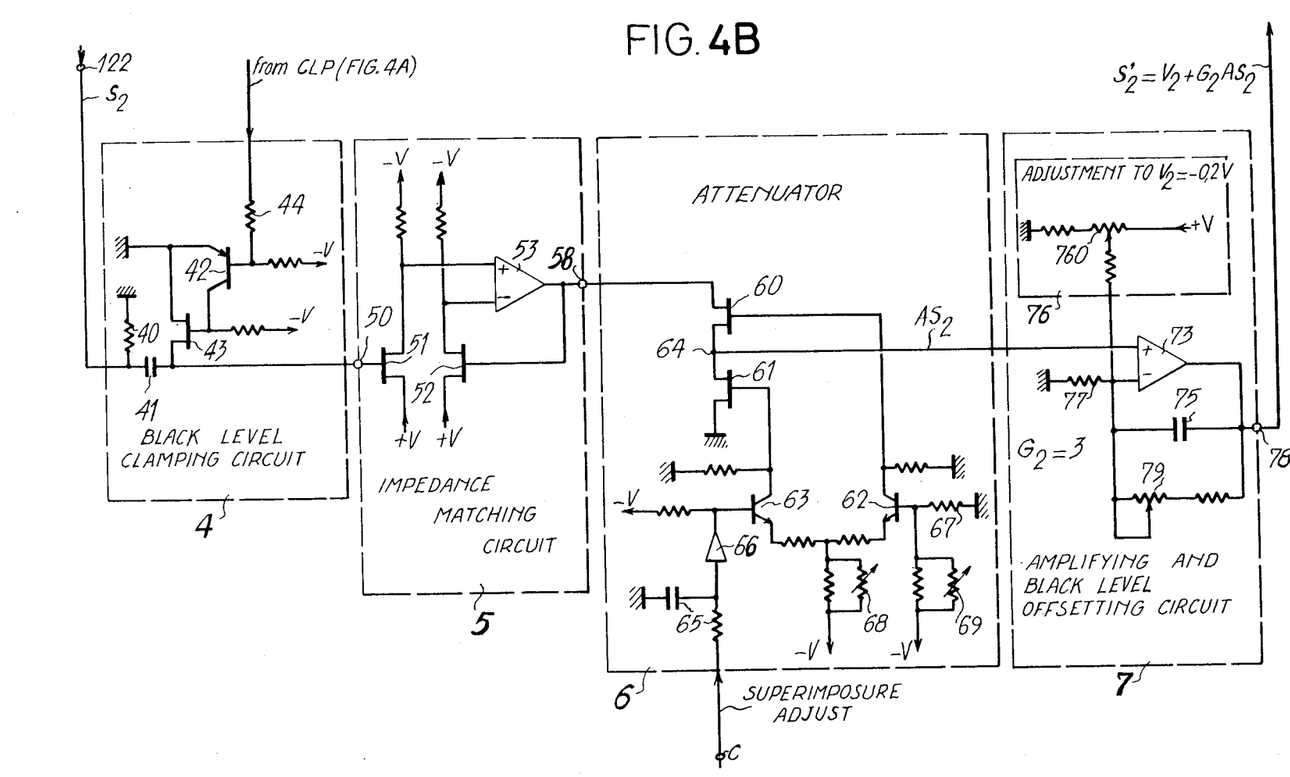

As shown in FIGS. 4A and 4B, the black level clamping circuits 2 and 4 are identical. Each of circuits 2, 4 comprises a known circuit for matching cables transmitting the respective signals S$_1$, S$_2$ via the inputs 12$_1$ and 12$_2$ to a clamper including two transistors. The clamper responds to pulses for black level clamping on clamping input CLP. The cable matching circuits respectively include resistors 20, 40 having a resistance equal to the cable characteristic impedance, typically 75 ohms, and coupling capacitors 21, 41. The transistor clampers respectively comprise pnp junction transistors 22, 42, field effect transistors (FET) 23, 43 having an emitter, and a source, respectively, connected to ground. The circuits of FIG. 4A include opposite polarity power supply voltages +V and −V, typically equal to +12 volts and −12 volts. Bases of transistors 22, 42 and collectors of transistor 23, 43 are biased to −V through suitable resistors.

The bases of transistors 22, 42 are respectively connected to the terminal CLP via resistors 24, 44. Collectors of transistors 22, 42 are connected to gates of transistors 23, 43. Drains of transistors 23, 43 are respectively connected to a terminal of capacitors 21, 41 and to input terminals 30, 50 of circuits 3, 5 that respond to the signals S$_1$, S$_2$, and having an amplitude clamped to the black, 0 volt level.

The circuit 3 shown in FIG. 4A comprises an amplifying and impedance matching circuit including FETs 31 and 32 and an operational amplifier 33 having a negative gain $G_1=-1.4$, as well as a circuit for offsetting the black level to V$_1=+0.5$ volt. The two transistors 31 and 32 have drains and sources respectively biased to +V and −V. Transistors 31 has a gate connected to the input terminal 30 and a source connected to an inverting input (−) of amplifier 33 through a resistor 34. The other transistor 32 has a gate connected to a resistor voltage divider 35 including an adjustable center resistor 350 and a shunt capacitor 351. Voltage divider 35 has terminals biased at +V and −V and enables adjustment of the black level offset in the clamped signal S$_1$ to V$_1=+0.5$ volt. Transistor 32 has a source connected to a noninverting input (+) of amplifier 33 through a resistor 36. The noninverting input (+) is connected to ground through a resistor 37, whereas the inverting input (−) is connected to an output 38 of amplifier 33 via an adjustable feedback resistor 39. Circuit components 33, 34, 36, 37 and 39 constitute a substractor-amplifier for subtracting the offset voltage V$_1=0.5$ volt from the signal S$_1$ amplifier with a gain $-G_1=+1.4$ to supply a signal $S'_1=V_1-(-G_1)S_1$ at the output 38.

In the second channel of the gain control circuit 12 shown in FIG. 4B, attenuator 6 is connected between impedance matching circuit 5 and amplifier 7.

The impedance matching circuit 5 transforms a high input impedance to a very low output impedance. Circuit 5 includes FETs 51 and 52 and an operational amplifier 53, arranged similarly to FETs 31 and 32 and amplifier 33, FIG. 4A. The input terminal 50 is connected to a gate of transistor 51. Sources of transistors 51 and 52 are respectively connected to the noninverting (+) and inverting (−) terminals of the amplifier 53 having an output 58 connected to a gate of transistor 52. The amplifier 53 has thus a gain equal to unity.

The attenuator 6 has a structure based on the operating principle of a variable-switching-speed analog switching and mixing circuit as taught in French patent application No. 2,484,109 filed June 4, 1980. Accordingly, the attenuator 6 comprises two variable resistors formed by the drain-source paths of two unsaturated FETs 60 and 61, and a differential amplifier having two npn junction transistors 62 and 63 operating in an unbalanced mode with a dissymmetrical output. The drains, or the sources, of FETs 60 and 61 are connected together and to an output terminal 64 of the attenuator 6. The gates of FETs 60 and 61 receive opposite-polarity signals derived at the collectors of the bipolar transistors 62 and 63, through the dissymmetrical output operation of the differential amplifier. The unbalanced mode of the differential amplifier is enabled by the application of a control signal C to a base of transistor 63, via a cable matching circuit including circuit 65 having a series resistor and a shunt capacitor, and via a follower amplifier 66, and by feeding the ground reference voltage to a base of the other bipolar transistor 62 via a resistor 67. Adjustment of the switching and mixing circuit is provided by a variable resistor 68 connected between the −V biasing terminal and a common terminal of two resistors connected to the emitters of transistors 62 and 63, and by another variable resistor 69 connected between the −V biasing terminal and the base of transistor 62.

The control input signal C for the attenuator 6 applied to the input of the circuit 65, is a variable amplitude signal to control the extent of superimposure or overlay of the second picture P₂ represented by the signals R₂, G₂, B₂ (FIG. 1A) or Y₂, DR₂, DB₂ (FIG. 1B), or by the signal SP₂ (FIGS. 1C or 1D), on the first picture P₁ represented by the signals R₁, G₁, B₁ (FIG. 1A) or Y₁, DR₁, DB₁ (FIG. 1B), or by the signal SP₁ (FIGS. 1C or 1D). Since the drain, or the source, of transistor 61 is grounded, varying the signal C provides direct attenuation of the signal S₂ at the output of circuit 5; attenuator 6 introduces variable attenuation factor A which is less than a predetermined constant; the predetermined constant is less than or equal to one and determined by variable resistors 68 and 69. When the signal C is at low "0" level, signal AS₂ at the output terminal 64 is null, thus eliminating the second picture P₂ in the resulting picture R transmitted by the superimposing system 1a, 1b, 1c or 1d.

In the amplifying and black level offsetting circuit 7 shown in FIG. 4B, attenuated signal AS₂ at the attenuator output 64 is applied to a noninverting (+) input of subtracting operational amplifier 73. Amplifier 73 and a resistor voltage divider 76 having a variable resistor 760 biased between +V and 0 volt fulfill the same functions as the amplifier 33 and the resistor voltage divider 35 in the first channel (FIG. 4A). An inverting terminal (−) of amplifier 73 is connected to an intermediate output terminal of the voltage divider 76 as well as to ground through a resistor 77, and to an output 78 of amplifier 73, via an adjustable feedback resistor 79 shunted by capacitor 75. However, the tap on variable resistor 760 is set to impart a negative black level offset $V_2 = -0.2$ volt, and resistor 79 is set to provide a positive amplification gain $G_2 = 3$ so that signal $S'_2$ at the output 78 is such that:

$$S'_2 = V_2 + G_2(AS_2).$$

Referring again to FIG. 4A, the comparing circuit 8 comprises two diodes 81 and 82 and an emitter-follower connected pnp junction transistor 83. Diodes 81 and 82 have anodes connected to outputs 38 and 78 of circuits 3 and 7 and have cathodes connected to a base of transistor 83. Each diode 81, 82 can be replaced by any suitable unidirectional component, such as an npn junction transistor having base and collector connected to the black level offset output terminal 38, 78 and having an emitter connected to the base of transistor 83. Diodes 81 and 82 select the signal of highest amplitude from between the two signals $S'_1$ and $S'_2$. Transistor 83 compensates the DC offset due to the diodes. An analog signal S derived from the comparing circuits 8 via the emitter of transistor 83 is applied to an input 90 of the output stage 9. Signal S is chopped within a 0 and 1 volt range in output stage 9 to supply the gain control signal α at the output 123 of the gain control circuit 12.

Figure 5:
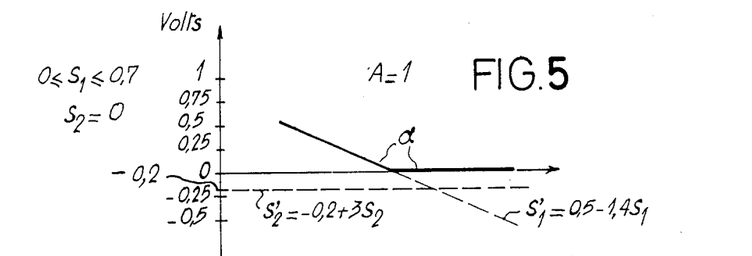
FIGS. 5 and 6 are timing diagrams of voltage variations of signals derived in the gain control circuit.
Figure 6:
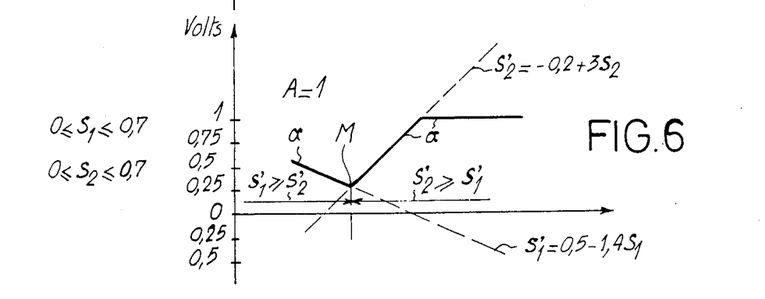

By way of example, in FIG. 5 a signal α is derived from a sawtooth signal S₁ in a 0 to 0.7 volt range and from a signal S₂ at the 0 volt black level, and in FIG. 6 a signal α is derived from two sawtooth signals S₁ and S₂ in the 0 to 0.7 volt range. It is assumed in both examples that the attenuation factor A is unity.

As shown particularly in FIG. 6, when $S'_2 > S'_1$ the amplitude of the control signal ' is between 1 volt and a level corresponding to a point M, such that $$S'_2 = S'_1$$

i.e. $V_1 + G_1 S_1 = V_2 + G_2 A S_2$

In this case, the superimpusure effect, in other words the overlay effect or mixing of the pictures P₁ and P₂, depends upon the second signal S₂ since $α = V_2 + G_2 A S_2$. The lower the level of the signal S₂, the more the first picture P₁ corresponding to the signal S₁ prevails in the resulting picture R. However, α does not depend solely on the amplitude of the second signal S₂; it also depends upon the voltage and gain parameters V₂ and G₂, and especially on the attenuation factor A which enables fine adjustment of the influence of the signal S₂ in the resulting picture, regardless of the amplitude of signal S₁. The converse also holds true with regard to S₁ when $S'_2 < S'_1$ and $α = V_1 + G_1 S_1$. Nevertheless, in this latter case, the superimpusure fine control signal C does not play a role in the mixing of the pictures as long as $S'_2$ is less than $S'_1$ since the picture to be superposed, represented by second signal S₂, is dark, or even black.

In all the cases represented in FIG. 6, there is at least a slight transparency of the second picture P₂ which allows the first picture P₁ to "show through" in the resulting picture R.

What I claim is:

1. A television picture superimposing system comprising
    mixing means including first and second variable gain amplifying means for amplifying first and second input picture signals having a predetermined peak-to-peak amplitude into first and second amplified picture signals and adding means for mixing said first and second amplified picture signals into a resulting picture signal, and means for deriving a single gain control signal based upon a predetermined linear combination of first and second signals derived respectively from said first and second input picture signals so that said resulting picture signal has said predetermined peak-to-peak amplitude, said gain control signal being applied, via analog inverting means and directly, to gain control inputs of said first and second variable gain amplifying means respectively.

2. The system claimed in claim 1 wherein said gain control signal deriving means comprises first and second amplifying and offsetting means for offsetting amplitudes of said first and second derived signals and amplifying the first and second offset derived signals into first and second intermediate signals, means for selecting the intermediate signal having the higher amplitude, and means for chopping said higher amplitude intermediate signal to derive said gain control signal.

3. The system claimed in claim 2 wherein each of said first and second amplifying and offsetting means comprises an operational amplifier operating as a substracting circuit, said operational amplifier having an input receiving the respective derived signal and another input receiving an adjustable offsetting voltage.

4. The system claimed in claim 2 wherein said first amplifying and offsetting means offsets and amplifies said first derived signal with a positive adjustable offset voltage and a negative adjustable gain, and said second amplifying and offsetting means offsets and amplifies said second derived signal with a negative adjustable offset voltage and a positive adjustable gain.

5. The system claimed in claim 2 wherein said selecting means comprises a transistor having a base connected via two unidirectional components such as diodes to the intermediate signals derived by said first and second amplifying and offsetting means.

6. The system claimed in claim 2 wherein said gain control signal deriving means comprises means for attenuating said second derived signal by an attenuation factor and applying the attenuated signal to said second amplifying and offsetting means.

7. The system claimed in claim 6 wherein said attenuating means includes a control input to adjust said attenuation factor.

8. The system claimed in claim 6 wherein said attenuating means comprises first and second field-effect transistors and a differential amplifier, said first transistor having a drain (or source) receiving said second derived signal, said second transistor having a grounded drain (or source) and sources connected together to supply said attenuated signal, said first and second transistors having gates respectively connected to first and second outputs of said differential amplifier, said differential amplifier having an input receiving an attenuation control signal to control a picture superimposure extent.

9. The system claimed in claim 8 wherein said differential amplifier operates in an unbalanced mode with a dissymmetrical output.

10. The system as claimed in claim 2 wherein said gain control signal deriving means comprises first and second 0 volt clamping and impedance matching means respectively receiving said first and second derived signals for supplying first and second clamped signals to said first and second amplifying and offsetting means.

11. A system as claimed in claim 1 wherein said first and second input picture signals are respectively in the form of three primary color first parallel signals and three primary color second parallel signals, said system comprising first and second video matrices for respectively combining said first and second primary color signals to derive first and second composite video signals as first and second derived signals, said mixing means including three variable gain first amplifiers and three variable gain second amplifiers for respectively amplifying said first and second primary signals to derive three amplified primary signals and three amplified second primary signals, and three adder circuits, each of said adder circuits mixing a first amplified primary signal and a second amplified primary signal associated with the same primary picture color, and said gain control signal being applied through said analog inverting means to gain control inputs of said first amplifiers and directly to gain control inputs of said second amplifiers.

12. A system as claimed in claim 1 wherein said first and second input picture signals are respectively in the form of first and second luminance signals and a first pair of parallel color difference signals and a second pair of parallel color difference signals, and corresponding first and second color pictures, said first and second luminance signals forming said first and second derived signals, said mixing means comprising three first variable gain amplifiers for respectively amplifying said first luminance signals and said first two color difference signals corresponding to said first color picture into a first amplified luminance signal and first pair of amplified color difference signals, second three variable gain amplifiers for respectively amplifying said second luminance signal and said second pair of color difference signals corresponding to said second picture into a second amplified luminance signal and second pair of amplified color difference signals, and three adder circuits for respectively mixing first and second amplified luminance signals, said first and second color difference signals associated with the same primary picture color and said first and second color difference signals associated with another same primary picture color, said gain control signal being applied via said analog inverting means to gain control inputs of said first amplifiers and directly to gain control inputs of said second amplifiers.

13. A system as claimed in claim 1 wherein said first and second input picture signals are first and second video signals encoded according to the NTSC or PAL television standard, said system comprising two low-pass filters for filtering said first and second encoded video signals into first and second luminance signals forming said first and second derived signals, and said mixing means comprising first and second variable gain amplifiers for respectively amplifying said first and second encoded video signals into first and second amplified encoded video signals, and an adder circuit for mixing said first and second amplified encoded video signals, said gain control signal being respectively applied through said analog inverting means to a gain control input of said first amplifier and directly to a gain control input of said second amplifier.

14. A system as claimed in claim 1 wherein said first and second picture signals are first and second video signals encoded according to SECAM television standard, said system comprising first and second demodulators for demodulating said first and second encoded video signals into first and second luminance signals forming said first and second derived signals and into first and second chrominance signals, and said mixing means comprising a first pair of variable gain amplifiers for amplifying said first luminance and chrominance signals into first amplified luminance and chrominance signals, a second pair of variable gain amplifiers for amplifying said second luminance and chrominance signals into second amplified luminance and chrominance signals, and a pair of adder circuits for mixing said first and second amplified luminance signals and for mixing said first and second amplified chrominance signals, said gain control signal being respectively applied through said analog inverting means to gain control inputs of said first amplifiers and directly to gain control inputs of said second amplifiers.

15. A television picture superimposing system receiving first primary color signals associated respectively with primary colors of a first television picture, and second primary color signals associated respectively with the primary colors of a second television picture, said first and second primary color signals having a predetermined peak-to-peak amplitude, said system comprising first variable gain amplifying means for amplifying said first received primary color signals into first amplified primary signals, second variable gain amplifying means for amplifying said second received primary color signals into second amplified primary color signals, adding means for mixing said first and second amplified primary color signals into resulting primary color signals associated respectively with said television picture primary colors, said resulting signals having said predetermined peak-to-peak amplitude, first means for combining said first received primary color signals to form a first composite video signal, second means for combining said second received primary color signals to form a second composite video signal, means for offsetting amplitudes of said first and second composite video signals with first and second adjustable offset voltages into first and second offset composite video signals respectively, means for amplifying said first and second offset composite video signals with first and second adjustable amplification gains to produce first and second intermediate signals respectively, means for selecting the one of said first and second intermediate signals having the higher amplitude, and means for chopping said higher amplitude intermediate signal into a gain control signal, said gain control signal being applied to gain control inputs of said first variable gain amplifying means through analog inverting means, and directly to gain control inputs of said second variable gain amplifying means.

16. A system as claimed in claim 15 comprising means for attenuating said second composite video signal by an adjustable attenuation factor into an attenuated signal, said attenuated signal and said first composite video signal being applied to said amplitude offsetting means.

17. A television picture superimposing system receiving a first luminance signal and a first pair of color difference signals representing a first television picture, and a second luminance signal and a second pair of color difference signals representing a second television picture, said first and second luminance and color difference signals having a predetermined peak-to-peak amplitude, said system comprising first variable gain amplifying means for amplifying said first received luminance and color difference signals into first amplified luminance and color difference signals, second variable gain amplifying means for amplifying said second received luminance and color difference signals into second amplified luminance and color difference signals, adding means for mixing said first amplified luminance and color difference signals respectively with said second luminance and color difference signals into a resulting luminance signal and a pair of resulting color difference signals, said resulting signals having said predetermined peak-to-peak amplitude, means for offsetting amplitudes of said first and second received luminance signals with first and second adjustable offset voltages into first and second offset luminance signals respectively, means for amplifying said first and second offset luminance signals with first and second adjustable amplification gains to produce first and second intermediate luminance signals respectively, means for selecting the one of said first and second intermediate luminance signals having the higher amplitude, and means for chopping said higher amplitude intermediate luminance signal into a gain control signal, said gain control signal being applied to gain control inputs of said first variable gain amplifying means through analog inverting means, and directly to gain control inputs of said second variable gain amplifying means.

18. A system as claimed in claim 17 comprising means for attenuating the second received luminance signal by an adjustable attenuating factor to form an attenuated luminance signal, said attenuated luminance signal and said first received luminance signal being applied to said amplitude offsetting means.

19. A television picture superimposing system receiving first and second video signals associated respectively with first and second color television pictures, and encoded according to the NTSC or PAL television standard, said first and second encoded video signals having a predetermined peak-to-peak amplitude, said system comprising first variable gain amplifying means for amplifying said first received encoded video signal into a first amplified encoded video signal, second variable gain amplifying means for amplifying said second received encoded video signal into a second amplified encoded video signal, adding means for mixing said first and second amplified encoded video signals to form a resulting encoded video signal having said predetermined peak-to-peak amplitude, means for low-pass filtering said first and second received encoded video signals to form first and second filtered luminance signals respectively, means for offsetting amplitudes of said first and second filtered luminance signals with first and second adjustable offset voltages to form first and second offset luminance signals respectively, means for amplifying said first and second offset luminance signals with first and second adjustable amplification gains to produce first and second intermediate luminance signals respectively, means for selecting the one of said first and second intermediate luminance signals having the higher amplitude, and means for chopping said higher amplitude intermediate luminance signal into a gain control signal, said gain control signal being applied to a gain control input of said first variable gain amplifying means through analog inverting means, and directly to a gain control input of said second variable gain amplifying means.

20. A system as claimed in claim 19 comprising means for attenuating said second filtered luminance signal by an adjustable attenuation factor to form an attenuated luminance signal, said attenuated luminance signal and said first filtered luminance signal being applied to said amplitude offsetting means.

21. A television picture superimposing system receiving first and second video signals associated respectively with first and second color television pictures and encoded according to the SECAM television standard, said first and second encoded video signals having a predetermined peak-to-peak amplitude, said system comprising first means for demodulating said first encoded video signal into a first luminance signal and a first chrominance signal, second means for demodulating said second encoded video signal into a second luminance signal and a second chrominance signal.

first variable gain amplifying means for amplifying said first luminance and chorminance signals to form first amplified luminance and chrominance signals respectively, second variable gain amplifying means for amplifying said second luminance and chrominance signals to form second amplified luminance and chrominance signals respectively, adding means for mixing said first and second amplified luminance signals to form a resulting luminance signal and for mixing said first and second chrominance signals to form a resulting chrominance signal, said resulting signals having said predetermined peak-to-peak amplitude, means connected to said first and second demodulating means for offsetting amplitudes of said first and second luminance signals with first and second adjustable offset voltages to form first and second offset luminance signals respectively, means for amplifying said first and second offset luminance signals with first and second adjustable amplification gains to produce first and second intermediate luminance signals respectively, means for selecting the one of said first and second intermediate luminance signals having the higher amplitude, and means for chopping said higher amplitude intermediate luminance signal into a gain control signal, said gain control signal being applied to gain control inputs of said first variable gain amplifying means through analog inverting means, and directly to gain control inputs of said second variable gain amplifying means.

22. A system as claimed in claim 21 further comprising means connected to said second demodulating means for attenuating said second luminance signal by an adjustable attenuation factor to form an attentuated luminance signal, said attenuated luminance signal and said first luminance signal derived by said first demodulating means being applied to said amplitude offsetting means.

* * * * *